United States Patent
Jacobson et al.

(10) Patent No.: US 9,626,319 B2
(45) Date of Patent: Apr. 18, 2017

(54) ALLOCATING LANES IN A PERIPHERAL COMPONENT INTERCONNECT EXPRESS ('PCIE') BUS

(71) Applicant: LENOVO ENTERPRISE SOLUTIONS (SINGAPORE) PTE. LTD., Singapore (SG)

(72) Inventors: Steven C. Jacobson, Mebane, NC (US); Loc X. Nguyen, Durham, NC (US); Luke D. Remis, Raleigh, NC (US); Timothy R. Tennant, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 127 days.

(21) Appl. No.: 13/974,519

(22) Filed: Aug. 23, 2013

(65) Prior Publication Data
US 2015/0058515 A1 Feb. 26, 2015

(51) Int. Cl.
*G06F 13/38* (2006.01)
*G06F 13/40* (2006.01)

(52) U.S. Cl.
CPC ........ *G06F 13/385* (2013.01); *G06F 13/4022* (2013.01)

(58) Field of Classification Search
CPC .................. G06F 2213/26; G06F 13/4022
See application file for complete search history.

(56) References Cited

U.S. PATENT DOCUMENTS

| | | | |
|---|---|---|---|
| 7,099,969 B2* | 8/2006 | McAfee et al. | 710/107 |
| 7,174,411 B1 | 2/2007 | Ngai | |
| 7,480,757 B2 | 1/2009 | Atherton et al. | |
| 7,539,809 B2 | 5/2009 | Juenger | |
| 7,657,688 B2 | 2/2010 | Atherton et al. | |
| 7,711,886 B2* | 5/2010 | Foster, Sr. | 710/313 |
| 7,793,029 B1 | 9/2010 | Parson et al. | |
| 7,849,249 B2 | 12/2010 | Shen et al. | |
| 7,934,032 B1* | 4/2011 | Sardella et al. | 710/104 |
| 7,979,592 B1* | 7/2011 | Pettey | G06F 13/404 709/205 |
| 8,103,993 B2 | 1/2012 | Atherton et al. | |
| 8,140,730 B2* | 3/2012 | Atherton | G06F 13/4295 710/301 |
| 8,255,599 B2 | 8/2012 | Shaikli | |
| 8,380,910 B2 | 2/2013 | Hess et al. | |
| 8,417,838 B2 | 4/2013 | Tamasi et al. | |
| 8,533,379 B2* | 9/2013 | Evoy | G06F 13/4282 710/313 |

(Continued)

OTHER PUBLICATIONS

"Hardware/Software Tradeoffs: A General Design Principle?" —3 pages, Dated Jan. 25, 1985.*

(Continued)

*Primary Examiner* — Brian Misiura
(74) *Attorney, Agent, or Firm* — Brandon C. Kennedy; Douglas W. Robinson; Kennedy Lenart Spraggins LLP

(57) ABSTRACT

Allocating lanes in a Peripheral Connect Interface Express ('PCIe') bus, including: determining, by a lane allocation module, performance capabilities of a device coupled to the PCIe bus; and allocating, by the lane allocation module, a number of lanes in the PCIe bus for use by the device in dependence upon the performance capabilities of the device.

12 Claims, 3 Drawing Sheets

(56) References Cited

U.S. PATENT DOCUMENTS

| | | | | |
|---|---|---|---|---|
| 8,972,640 B2* | 3/2015 | Wagh | ............................ | 710/105 |
| 9,057,766 B2* | 6/2015 | Al-Omari | ........ | G01B 31/31856 |
| 9,183,610 B2* | 11/2015 | Saulters | ................... | G06T 1/20 |
| 9,420,026 B2* | 8/2016 | Baldwin | ............... | H04L 65/602 |
| 2007/0038794 A1* | 2/2007 | Purcell et al. | ................ | 710/306 |
| 2012/0260015 A1 | 10/2012 | Gay et al. | | |
| 2013/0332634 A1* | 12/2013 | Glaser | ........................... | 710/104 |

OTHER PUBLICATIONS

Ngai, H., "Lane routing in PCI Express", Embedded Computing Design Annual Product Directory, Sep. 2005, 3 pp., embedded-computing.com (online), URL: http://embedded-computing.com/pdfs/Pericom.Sep05.pdf.

* cited by examiner

ALLOCATING LANES IN A PERIPHERAL COMPONENT INTERCONNECT EXPRESS ('PCIE') BUS

BACKGROUND OF THE INVENTION

Field of the Invention

The field of the invention is data processing, or, more specifically, methods, apparatus, and products for allocating lanes in a Peripheral Component Interconnect Express ('PCIe') bus.

Description of Related Art

Modern computing systems include peripheral devices that are coupled to a computer processor via an expansion bus. Such an expansion bus may be embodied as a PCIe bus that may be coupled to many different types of peripheral devices. The number of lanes in a PCIe bus that may be utilized by a peripheral device is typically determined based on the physical structure of the peripheral device, with no consideration given to the amount of data that the peripheral device will transmit over the PCIe bus.

SUMMARY OF THE INVENTION

Methods, apparatuses, and products for allocating lanes in a Peripheral Component Interconnect Express ('PCIe') bus, including: determining, by a lane allocation module, performance capabilities of a device coupled to the PCIe bus; and allocating, by the lane allocation module, a number of lanes in the PCIe bus for use by the device in dependence upon the performance capabilities of the device The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
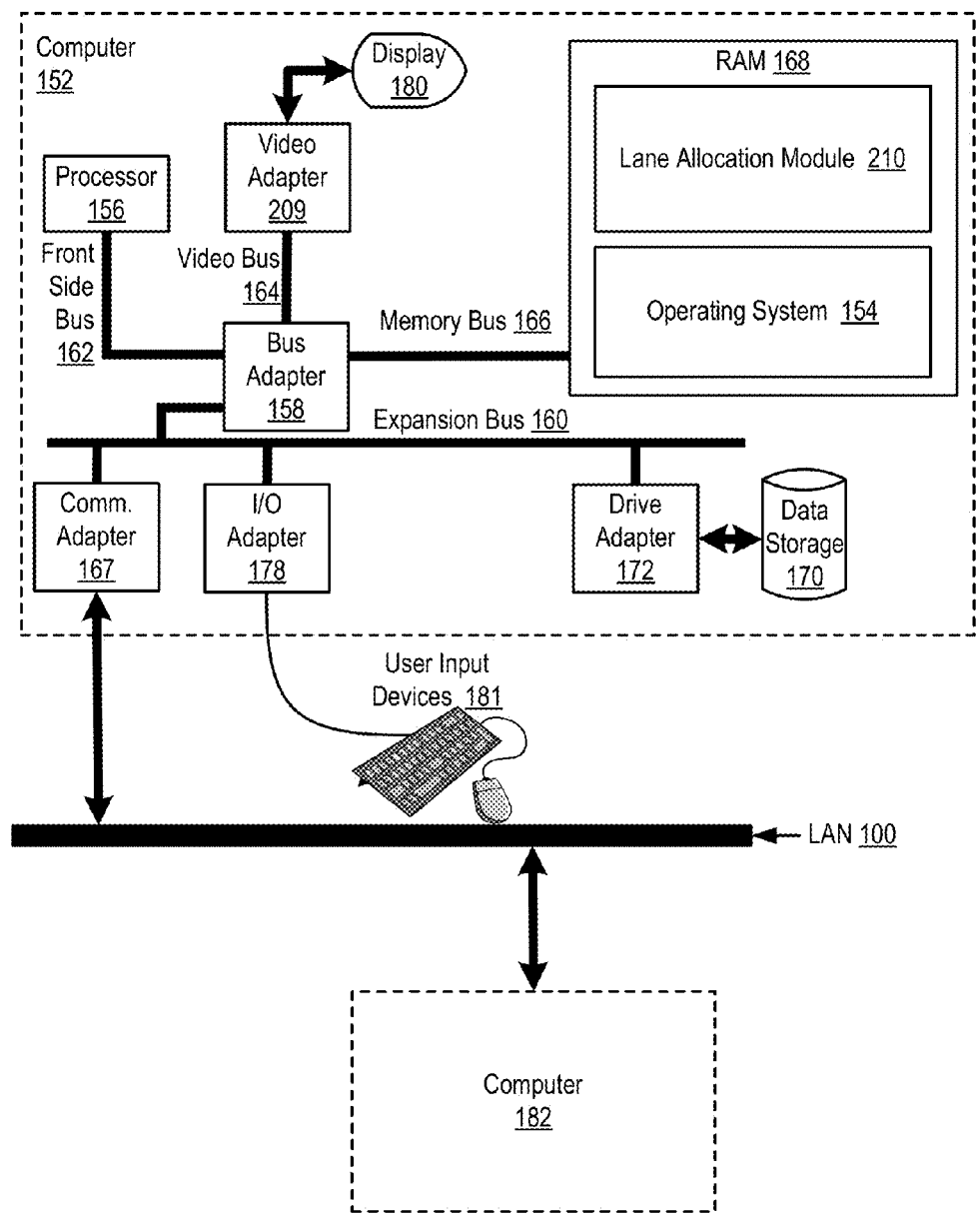
FIG. 1 sets forth a block diagram of automated computing machinery comprising an example computer useful in allocating lanes in a PCIe bus according to embodiments of the present invention.

Example methods, apparatus, and products for allocating lanes in a Peripheral Component Interconnect Express ('PCIe') bus in accordance with the present invention are described with reference to the accompanying drawings, beginning with FIG. 1. FIG. 1 sets forth a block diagram of automated computing machinery comprising an example computer (152) useful in allocating lanes in a PCIe bus according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a lane allocation module (210), a module of computer program instructions for allocating lanes in a PCIe bus, such as the expansion bus (160) depicted in FIG. 1. PCIe is a high-speed serial computer expansion bus standard. A PCIe bus, such as the expansion bus (160) depicted in FIG. 1, is a serial computer expansion bus that adheres to the PCIe standard. Such a PCIe bus can include shared lines such that a PCI host and a connected device each share a common set of address/data/signal lines. A PCIe bus can include a plurality of lanes, each of which may be composed of two differential signaling pairs. The first differential signaling pair can be configured for receiving data while the other differential signaling pair can be configured for transmitting data. As such, each lane may be composed of four wires or signal traces.

A PCIe bus can include a set number of lanes, each of which provide bandwidth to a device that is connected to the PCIe bus. As such, low-speed peripherals such as an 802.11 Wi-Fi adapter may utilize fewer lanes while high-speed peripherals such as a graphics adapter may utilize more lanes. In such a way, the PCIe bus represents a very flexible interconnect between two devices—such as a processor and a peripheral device—as the PCIe bus can couple devices that require varying bandwidths. The number of lanes utilized to facilitate data communications between two devices can be expressed with an 'X' prefix, such that X16 represents a sixteen-lane connection while X2 represents a two-lane connection.

The lane allocation module (210) of FIG. 1 may be configured to allocate lanes in a PCIe bus, for example, by determining performance capabilities of a device that is coupled to the PCIe bus. Such performance capabilities of a device that is coupled to the PCIe bus may include, for example, the rate at which the device can process data. Consider an example in which the device that is coupled to the PCIe bus is embodied as a network interface controller ('NIC'). In such an example, the performance capabilities of such a device can include the data transmission rates supported by the NIC. In such a way, a 10 Mb/s Ethernet adapter will have different performance capabilities than a 100 Mb/s Ethernet adapter. Determining the performance capabilities of a device that is coupled to the PCIe bus may be carried out, for example, by polling the device for such information, by conducting performance tests on the device to extract such information, and in other ways as will occur to those of skill in the art.

The lane allocation module (210) of FIG. 1 may be further configured to allocate lanes in a PCIe bus, for example, by allocating a number of lanes in the PCIe bus for use by the device in dependence upon the performance capabilities of the device. Allocating a number of lanes in the PCIe bus in dependence upon the performance capabilities of the device may be carried out, for example, by allocating enough lanes in the PCIe bus such that data can be transferred to or from the device over the PCIe bus at a rate that allows the device to make use of its performance capabilities.

Consider the example described above in which the device is a NIC. In such an example, if the performance capabilities of the NIC indicates that the NIC is a 10 Mb/s Ethernet adapter, the number of lanes needed by the NIC to allow the NIC to make use of its performance capabilities may be equal to the number of lanes required to transfer data to and from the NIC at a rate of 10 Mb/s. Alternatively, if the performance capabilities of the NIC indicates that the NIC is a 100 Mb/s Ethernet adapter, the number of lanes needed by the NIC to allow the NIC to make use of its performance capabilities may be equal to the number of lanes required to transfer data to and from the NIC at a rate of 100 Mb/s. In such a way, the number of lanes in the PCIe bus that are allocated for use by the device is a function of the performance capabilities of the device.

Also stored in RAM (168) is an operating system (154). Operating systems useful allocating lanes in a PCIe bus according to embodiments of the present invention include UNIX™ Linux™ Microsoft XP™ AIX™ IBM's i5/OS™ and others as will occur to those of skill in the art. The operating system (154) and the lane allocation module (210) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for allocating lanes in a PCIe bus according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182), such as a standalone computer, network switch, router, and so on. The communications adapter (167) is also configured for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for allocating lanes in a PCIe bus according to embodiments of the present invention include modems for wired dial-up communications, Ethernet (IEEE 802.3) adapters for wired data communications network communications, and 802.11 adapters for wireless data communications network communications.

Figure 2:
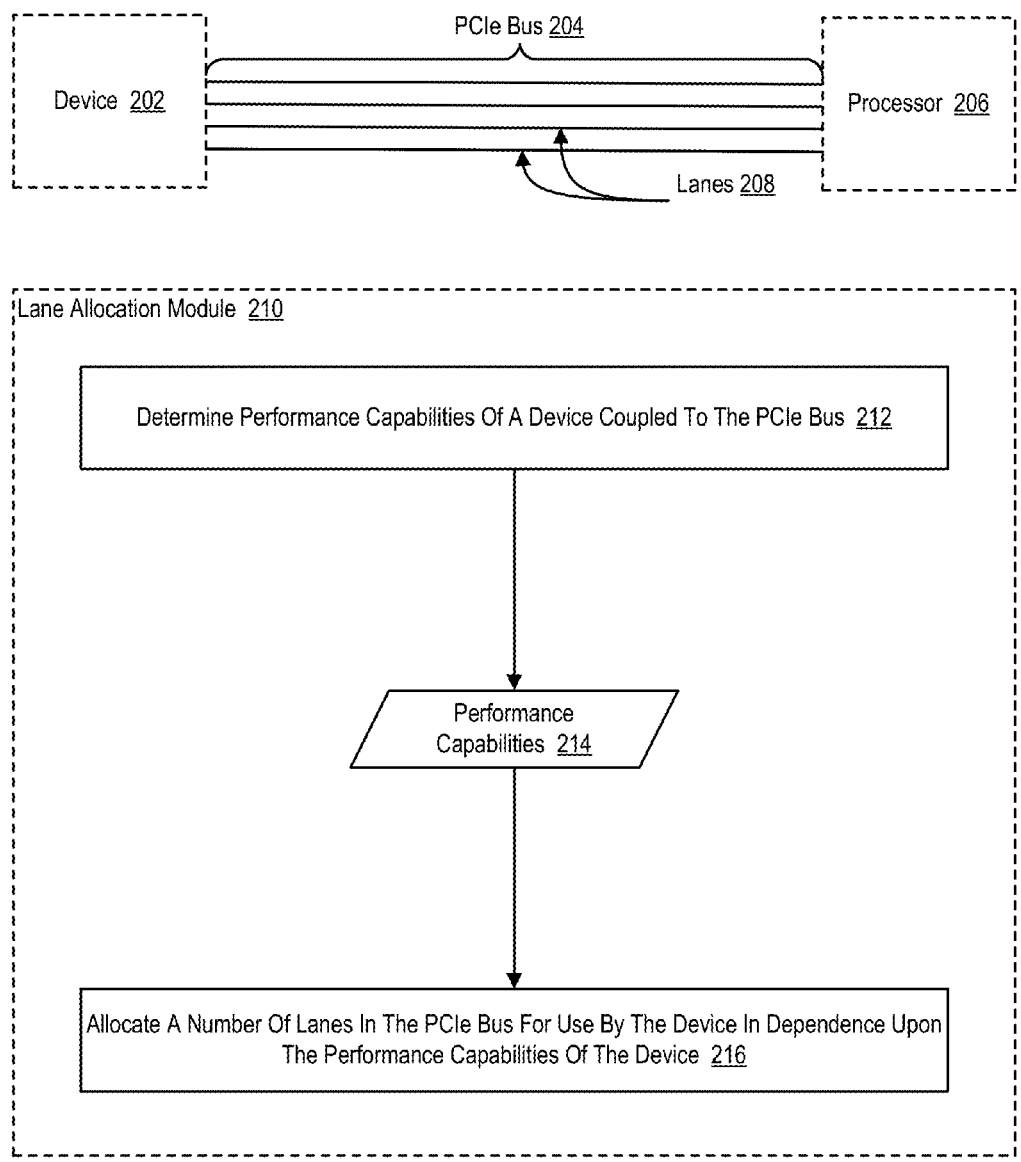
FIG. 2 sets forth a flow chart illustrating an example method for allocating lanes in a PCIe bus according to embodiments of the present invention.

For further explanation, FIG. 2 sets forth a flow chart illustrating an example method for allocating lanes (208) in a PCIe bus (204) according to embodiments of the present invention. PCIe is a high-speed serial computer expansion bus standard. A PCIe bus (204), as depicted in FIG. 2, is a serial computer expansion bus that adheres to the PCIe standard. The PCIe bus (204) of FIG. 2 therefore includes shared lines such that a PCI host and a connected device each share a common set of address/data/signal lines.

In the example of FIG. 2, the PCIe bus (204) includes a plurality of lanes (208). Each lane (208) may be composed of two differential signaling pairs. The first differential signaling pair is configured for receiving data while the other differential signaling pair is configured for transmitting data. As such, each lane (208) may be composed of four wires or signal traces.

The PCIe bus (204) of FIG. 2 includes a set number of lanes (208), each of which provide additional bandwidth to a device (202) that is connected to the PCIe bus (204). As such, low-speed peripherals such as an 802.11 Wi-Fi adapter may utilize fewer lanes (208) while high-speed peripherals such as a graphics adapter utilize more lanes (208). In such a way, the PCIe bus (204) represents a very flexible interconnect between two devices—such as a processor (206) and a peripheral device (202)—as the PCIe bus (204) can couple devices that require varying bandwidths.

The number of lanes (208) utilized to facilitate data communications between two devices (202, 206) can be expressed with an 'X' prefix, such that X16 represents a sixteen-lane connection while X2 represents a two-lane connection.

The example method of FIG. 2 is carried out, at least partially, by a lane allocation module (210). The lane allocation module (210) of FIG. 2 may be embodied as a module of computer program instructions executing on computer hardware. The lane allocation module (210) of FIG. 2 may include special purpose instructions for communicating, directly or indirectly, with the device (202), other devices connected to the device (202), a PCIe bus adapter, and other computer hardware for allocating lanes (208) in the PCIe bus (204).

The example method of FIG. 2 includes determining (212), by a lane allocation module (210), performance capabilities (214) of a device (202) coupled to the PCIe bus (204). In the example method of FIG. 2, performance capabilities (214) of a device (202) coupled to the PCIe bus (204) may represent, for example, the rate at which the device (202) can process data. Consider an example in which the device (202) is embodied as a network interface controller ('NIC'). In such an example, the performance capabilities (214) of such a device (202) can include the data transmission rates supported by the NIC. In such a way, a 10 Mb/s Ethernet adapter will have different performance capabilities (214) than a 100 Mb/s Ethernet adapter. In the example method of FIG. 2, determining (212) the performance capabilities (214) of a device (202) coupled to the PCIe bus (204) may be carried out, for example, by polling the device (202) for such information, by conducting performance tests on the device (202) to extract such information, and in other ways as will occur to those of skill in the art.

The example method of FIG. 2 also includes allocating (216), by the lane allocation module (210), a number of lanes (208) in the PCIe bus (204) for use by the device (202) in dependence upon the performance capabilities (214) of the device (202). In the example method of FIG. 2, allocating (216) a number of lanes (208) in the PCIe bus (204) for use by the device (202) in dependence upon the performance capabilities (214) of the device (202) may be carried out, for example, by allocating enough lanes (208) in the PCIe bus (204) such that data can be transferred to or from the device (202) over the PCIe bus (204) at a rate that allows the device (202) to make use of its performance capabilities (214).

Consider the example described above in which the device (202) is a NIC. In such an example, if the performance capabilities (214) of the NIC indicates that the NIC is a 10 Mb/s Ethernet adapter, the number of lanes (208) needed by the NIC to allow the NIC to make use of its performance capabilities (214) may be equal to the number of lanes (208) required to transfer data to and from the NIC at a rate of 10 Mb/s. Alternatively, if the performance capabilities (214) of the NIC indicates that the NIC is a 100 Mb/s Ethernet adapter, the number of lanes (208) needed by the NIC to allow the NIC to make use of its performance capabilities (214) may be equal to the number of lanes (208) required to transfer data to and from the NIC at a rate of 100 Mb/s. In such a way, the number of lanes (208) in the PCIe bus (204) that are allocated (216) for use by the device (202) is a function of the performance capabilities (214) of the device (202).

Figure 3:
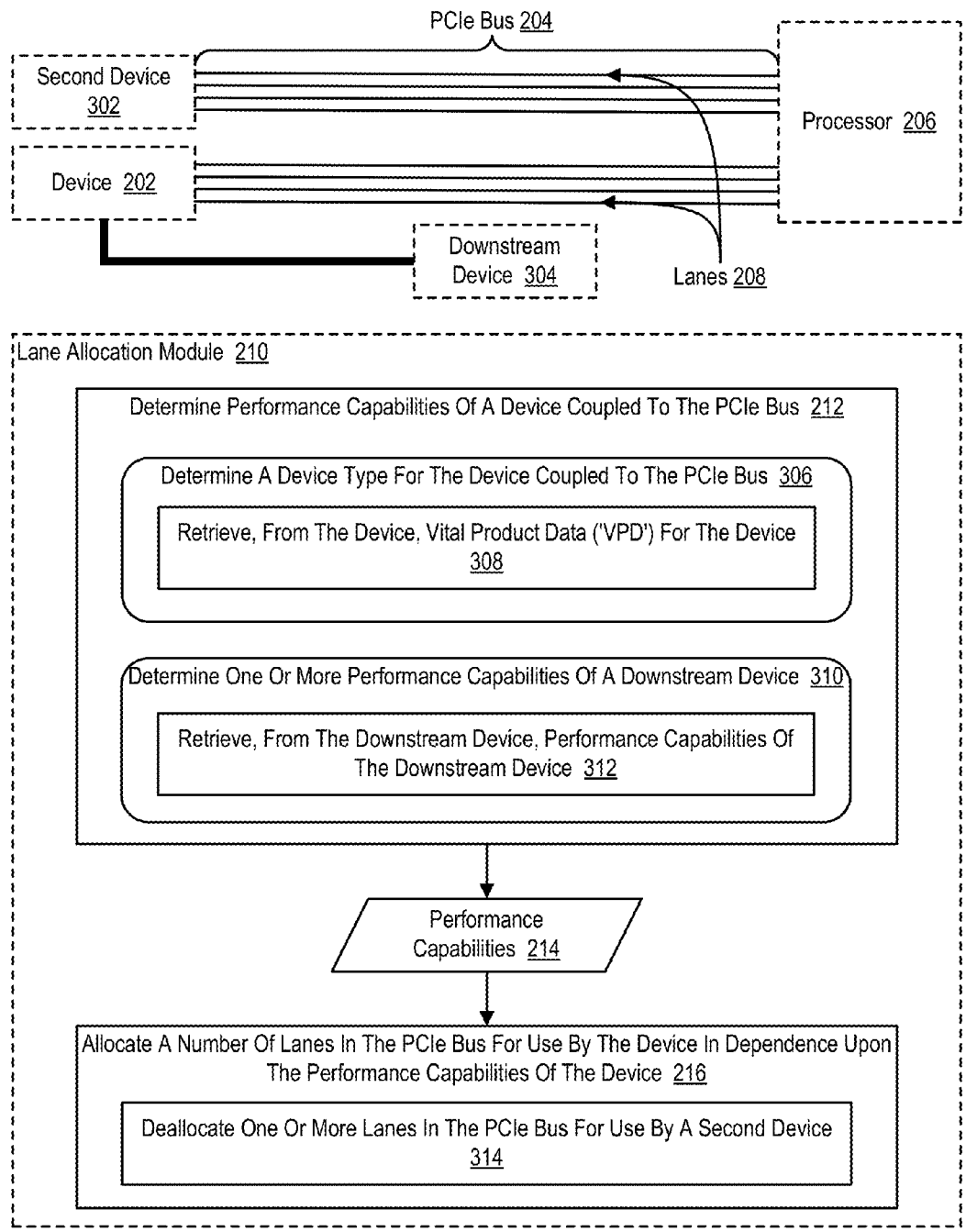
FIG. 3 sets forth a flow chart illustrating an additional example method for allocating lanes in a PCIe bus according to embodiments of the present invention.

For further explanation, FIG. 3 sets forth a flow chart illustrating an additional example method for allocating lanes (208) in a PCIe bus (204) according to embodiments of the present invention. The example method of FIG. 3 is similar to the example method of FIG. 2, as it also includes determining (212) performance capabilities (214) of a device (202) coupled to the PCIe bus (204) and allocating (216) a number of lanes (208) in the PCIe bus (204) for use by the device (202) in dependence upon the performance capabilities (214) of the device (202).

In the example method of FIG. 3, determining (212) performance capabilities (214) of a device (202) coupled to the PCIe bus (204) includes determining (306) a device type for the device (202) coupled to the PCIe bus (204). As described above, devices that support high data processing rates may more effectively use a larger number of lanes (208) that devices that support lower data processing rates. As such, it may be desirable to allocate more lanes (208) to a graphics processor than a slow-speed modem, simply by virtue of the device type of each device. As such, the device type for the device (202) may be a useful in determining (212) the performance capabilities (214) of a device (202). In order to make use of information identifying the device type for the device (202) coupled to the PCIe bus (204), the lane allocation module (210) can maintain a table or other repository that associates various device types with the performance capabilities (214) of each device type.

In the example method of FIG. 3, determining (306) a device type for the device (202) coupled to the PCIe bus (204) can include retrieving (308), from the device (202), vital product data ('VPD') for the device (202). Although not illustrated in FIG. 3, the lane allocation module (210) may be coupled to the device (202), directly or indirectly, via a data communications bus such as an I2C bus. As such, the lane allocation module (210) may request VPD from the device (202) over the I2C bus. The VPD for the device (202) can include information identifying the device (202), information identifying a device type for the device (202), information identifying performance capabilities (214) of the device (202), and so on.

In the example method of FIG. 3, determining (212) performance capabilities (214) of a device (202) coupled to the PCIe bus (204) can also include determining (310) one or more performance capabilities of a downstream device (304). In the example method of FIG. 3, the downstream device (304) represents a device that is coupled, directly or indirectly, to the device (202) over a data communications channel other than the PCIe bus (204). If the device (202) coupled to the PCIe bus (204) is embodied as a wireless NIC, for example, the downstream device (304) may be embodied as a wireless router that is coupled to the wireless NIC for data communications. In such an example, the performance capabilities of a downstream device (304) can impact the performance of the device (202) coupled to the PCIe bus (204). For example, if the device (202) coupled to the PCIe bus (204) is a wireless NIC that supports data transfer rates of 100 Mb/s and the downstream device (304) is a wireless router that supports data transfer rates of 10 Mb/s, the device (202) that is coupled to the PCIe bus (204) will only be able to conduct data transfers at a rate of 10 Mb/s while connected to the downstream device (304)—in spite of the fact that the device (202) itself is capable of a higher rate of data transfers. In such a way, the effective performance capabilities (214) of the device (202) is only 10 Mb/s, and as such, the number of lanes (208) allocated for use by the device (202) can be set to a number that supports the effective performance capabilities (214) of the device (202).

In the example method of FIG. 3, determining (310) one or more performance capabilities of a downstream device (304) can include retrieving (312), from the downstream device (304), performance capabilities of the downstream device (304). In the example method of FIG. 3, retrieving (312) performance capabilities of the downstream device (304) from the downstream device (304) may be carried out, for example, by the lane allocation module (210) requesting such information from the downstream device (304), by the lane allocation module (210) requesting device type information from the downstream device (304), by the lane allocation module (210) initiating performance tests, and so on. For example, when the downstream device (304) is embodied as a wireless router as described above, the lane allocation module (210) may initiate ping operations directed to the downstream device (304) so as to determine the response time of the downstream device (304).

In the example method of FIG. 3, allocating (216) a number of lanes (208) in the PCIe bus (204) for use by the device (202) in dependence upon the performance capabilities (214) of the device (202) can include deallocating (314) one or more lanes (208) in the PCIe bus (204) for use by a second device (302). In the example method of FIG. 3, multiple devices (202, 302) may be coupled to the PCIe bus (204)—although only a single device may be actively receiving data over the PCIe bus (204) at a given point in time. For example, an Ethernet adapter may be coupled to lanes 0-15 of the PCIe bus (204) and a modem may be coupled to lanes 16-19 of the PCIe bus (204). In such an example, data from the processor (206) may be routed to the appropriate device (202, 302) through the use of a multiplexer (not shown) that resides between the processor (206) and devices (202, 302) along the PCIe bus (204). Such a multiplexer may be configured with information identifying the active connected device—and therefore the lanes over which data should be transmitted—when the system is booted. In such a way, certain lanes are allocated to specific devices even when the connected device is not active.

In the example method of FIG. 3, allocating (216) a number of lanes (208) in the PCIe bus (204) for use by an active device (202) may therefore include deallocating (314) one or more lanes (208) in the PCIe bus (204) for use by an inactive, second device (302). Consider the example described above in which an Ethernet adapter is coupled to lanes 0-15 of the PCIe bus (204) through a multiplexer and a modem is coupled to lanes 16-19 of the PCIe bus (204) through a multiplexer. Assume that the PCIe bus (204)

includes 40 lanes (208) and that a graphics adapter that can utilize 24 lanes is attached to the PCIe bus (204) through a multiplexer. In such an example, only 20 lanes (208) of the PCIe bus (204)—lanes 20-39—are available for use by the graphics adapter. In order to allocate 24 lanes (204) to the graphics adapter, some lanes (208) must be deallocated from the Ethernet adapter or the modem. As such, allocating (216) a number of lanes (208) in the PCIe bus (204) for use by the graphics adapter may be carried out by deallocating (314) one or more lanes (208) in the PCIe bus (204) for use by an inactive, second device (302) such as the modem. In such an example, the multiplexer may be configured at boot time to allocate lanes (208) 16-39 of the PCIe bus (204) to the graphics adapter, leaving no lanes (208) available for the inactive modem.

Example embodiments of the present invention are described largely in the context of a fully functional computer system for allocating lanes in a PCIe bus. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that, when executed by the computer processor, cause the apparatus to carry out the steps of:
    determining performance capabilities of a device coupled to a Peripheral Component Interconnect Connect Interface Express (PCIe) bus, including:
        retrieving, from a downstream device, performance capabilities of a downstream device by initiating performance tests with the downstream device, wherein the performance tests include ping operations directed to the downstream device that determine a response time of the downstream device;
        maintaining a repository that associates various device types with performance capabilities of each of the various device types;
        determining a device type for the device coupled to the PCIe bus;
        retrieving, from the repository, performance capabilities of the device; and
        determining whether one or more performance capabilities of a downstream device are less than the performance capabilities of the device coupled to the PCIe bus, wherein the downstream device is coupled to the device over a data communications channel other than the PCIe bus; and
    allocating, in response to determining that the one or more performance capabilities of a downstream device are less than the performance capabilities of the device, a number of lanes in the PCIe bus for use by the device in dependence upon the performance capabilities of the downstream device, including allocating fewer lanes in the PCIe bus for use by the device than would be allocated for the device if the allocating were performed in dependence upon the performance capabilities of the device.

2. The apparatus of claim 1 wherein determining a device type for the device coupled to the PCIe bus further comprises retrieving, from the device, vital product data ('VPD') for the device.

3. The apparatus of claim 1 wherein allocating the number of lanes in the PCIe bus for use by the device in dependence upon the performance capabilities of the device further comprises deallocating one or more lanes in the PCIe bus for use by a second device.

4. A computer program product including a non-transitory computer readable medium, the computer program product comprising computer program instructions that, when executed, cause a computer to carry out the steps of:
    determining performance capabilities of a device coupled to a Peripheral Component Interconnect Connect Interface Express (PCIe) bus, including:
        retrieving, from a downstream device, performance capabilities of a downstream device by initiating performance tests with the downstream device, wherein the performance tests include ping operations directed to the downstream device that determine a response time of the downstream device;
        maintaining a repository that associates various device types with performance ca s abilities of each of the various device types;
        determining a device type for the device coupled to the PCIe bus;
        retrieving, from the repository, performance capabilities of the device; and
        determining whether one or more performance capabilities of a downstream device are less than the performance capabilities of the device coupled to the PCIe bus, wherein the downstream device is coupled to the device over a data communications channel other than the PCIe bus; and
    allocating, in response to determining that the one or more performance capabilities of a downstream device are less than the performance capabilities of the device, a number of lanes in the PCIe bus for use by the device in dependence upon the performance capabilities of the downstream device, including allocating fewer lanes in the PCIe bus for use by the device than would be allocated for the device if the allocating were performed in dependence upon the performance capabilities of the device.

5. The computer program product of claim 4 wherein determining a device type for the device coupled to the PCIe bus further comprises retrieving, from the device, vital product data ('VPD') for the device.

6. The computer program product of claim 4 wherein allocating the number of lanes in the PCIe bus for use by the device in dependence upon the performance capabilities of the device further comprises deallocating one or more lanes in the PCIe bus for use by a second device.

7. The computer program product of claim 4 wherein the computer readable medium comprises a computer readable storage medium.

8. A method comprising:
    determining performance capabilities of a device coupled to a Peripheral Component Interconnect Connect Interface Express (PCIe) bus, including:
        retrieving, from a downstream device, performance capabilities of a downstream device by initiating performance tests with the downstream device, wherein the performance tests include ping operations directed to the downstream device that determine a response time of the downstream device;

maintaining a repository that associates various device types with performance capabilities of each of the various device types;

determining a device type for the device coupled to the PCIe bus;

retrieving, from the repository, performance capabilities of the device; and determining whether one or more performance capabilities of a downstream device are less than the performance capabilities of the device coupled to the PCIe bus, wherein the downstream device is coupled to the device over a data communications channel other than the PCIe bus; and allocating, in response to determining that the one or more performance capabilities of a downstream device are less than the performance capabilities of the device, a number of lanes in the PCIe bus for use by the device in dependence upon the performance capabilities of the downstream device, including allocating fewer lanes in the PCIe bus for use by the device than would be allocated for the device if the allocating were performed in dependence upon the performance capabilities of the device.

9. The method of claim 8 wherein determining a device type for the device coupled to the PCIe bus further comprises retrieving, from the device, vital product data ('VPD') for the device.

10. The method of claim 8 wherein allocating the number of lanes in the PCIe bus for use by the device in dependence upon the performance capabilities of the device further comprises deallocating one or more lanes in the PCIe bus for use by a second device.

11. The method of claim 1 wherein the allocating the number of lanes includes allocating a number of lanes equal to a maximum performance capability of the downstream device.

12. The method of claim 1 further comprising allocating, in response to determining that the one or more performance capabilities of a downstream device are more than the performance capabilities of the device, a number of lanes in the PCIe bus for use by the device in dependence upon the performance capabilities of the device.

* * * * *